United States Patent [19]
Sutton et al.

[11] 3,903,274
[45] Sept. 2, 1975

[54] ANTI-ARTHRITIC COMPOSITIONS COMPRISING PHOSPHINE OR PHOSPHITE GOLD COMPLEXES OF THIOBENZOIC ACID AND SUBSTITUTED THIOPHENOLS AND METHODS OF PRODUCING ANTI-ARTHRITIC ACTIVITY

[75] Inventors: Blaine M. Sutton, Hatboro; Joseph Weinstock, Phoenixville, both of Pa.

[73] Assignee: SmithKline Corporation, Philadelphia, Pa.

[22] Filed: July 17, 1974

[21] Appl. No.: 489,197

Related U.S. Application Data

[62] Division of Ser. No. 381,832, July 23, 1973, Pat. No. 3,842,107.

[52] U.S. Cl. ............................................... 424/223
[51] Int. Cl.$^2$........................................ A61K 31/66
[58] Field of Search.................................... 424/223

*Primary Examiner*—Stanley J. Friedman
*Attorney, Agent, or Firm*—Janice E. Williams; Richard D. Foggio; William H. Edgerton

[57] ABSTRACT

Phosphine or phosphite gold complexes of thiobenzoic acid and substituted thiophenols having anti-arthritic activity are prepared by reaction of an appropriate phosphine or phosphite gold(I) halide with a substituted thiobenzoic acid or a substituted thiophenol in the presence of alkali.

15 Claims, No Drawings

ANTI-ARTHRITIC COMPOSITIONS COMPRISING PHOSPHINE OR PHOSPHITE GOLD COMPLEXES OF THIOBENZOIC ACID AND SUBSTITUTED THIOPHENOLS AND METHODS OF PRODUCING ANTI-ARTHRITIC ACTIVITY

This is a division of application Ser. No. 381,832 filed July 23, 1973 now U.S. Pat. No. 3,842,107.

This invention relates to novel phosphine or phosphite gold complexes of thiobenzoic acid and substituted thiophenols which have useful pharmacological activity. More specifically, the compounds of this invention have anti-arthritic activity as measured by their ability to inhibit adjuvant-induced polyarthritis in rats.

The compounds of this invention are represented by the following structural formula:

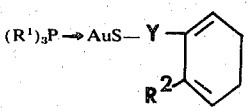

FORMULA I in which:

$R^1$ is lower alkyl, lower alkoxy, phenyl or phenoxy with each alkyl or alkoxy having from one to three carbon atoms;

Y is a carbon-sulfur single bond or C=O;

$R^2$ is hydrogen, amino or COOM when Y is C=O, or amino or COOM when Y is a carbon-sulfur single bond; and M is hydrogen or an alkali metal cation.

Preferred compounds of this invention are represented by Formula I where $R^1$ is lower alkyl of from one to three carbon atoms. Also preferred are those compounds of Formula I where $R^2$ is hydrogen when Y is C=O.

The compounds of this invention are prepared by reaction of a substituted thiobenzoic acid or a substituted thiophenol with a phosphine or phosphite gold halide, for example triethylphosphinegold(I) chloride, in the presence of alkali such as sodium or potassium hydroxide in a solvent such as ethanol or aqueous ethanol at about 25° for one hour. When $R^2$ is carboxy, the reaction mixture is acidified to liberate the free acid product. The product phosphine or phosphite gold complexes are purified by standard crystallization or chromatographic techniques.

The phosphine or phosphite gold halides employed as starting materials are prepared by reaction of a cold (−10° to −5°) solution of gold(I) chloride, prepared by mixing thiodiglycol and gold acid chloride trihydrate in aqueous alcohol, with an appropriate phosphine or phosphite. Other procedures which may be applied to the preparation of these intermediates are found in *J. Chem. Soc.*, 1828 (1937) and 1235 (1940) and *Australian J. Chem.*, 19:547 (1966).

Some phosphine and phosphite gold complexes are known to have anti-arthritic activity, but their utility is limited by the requirement that they be administered by the parenteral route. The compounds of this invention have the distinct advantage of being active upon oral administration.

Although the preparation of S-triethylphosphine(thiophenyl)gold is described [*Australian J. Chem.*, 19:539 (1966)], the benzoyl derivatives and substituted phenyl derivatives are not reported. No pharmacological activity has been disclosed for compounds of this class.

The anti-arthritic activity of the compounds of this invention is measured by their ability to inhibit adjuvant-induced polyarthritis in rats. The compounds of Formula I produce marked inhibition of the development of adjuvant arthritis in rats at daily oral doses as low as about 10 mg. per kilogram of body weight. Of particular importance is the attainment of significant serum levels of gold following oral administration of these doses.

Adjuvant arthritis in rats is produced by a single injection of 0.75 mg. of *Mycobacterium butyricum* suspended in white paraffin (N.F.) into a hindpaw (left footpad). The injected leg becomes inflamed and reaches a maximum volume in three to five days (primary lesion). The animals exhibit a decrease in body weight gain during this initial period. Adjuvant arthritis (secondary phase) occurs after a delay of approximately ten days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days thereafter, exclusive of days 4, 5, 11 and 12, protect the animals against development of both primary and secondary lesions of adjuvant arthritis.

The compounds of this invention are administered in conventional dosage unit forms by incorporating an amount sufficient to produce anti-arthritic activity, without toxic effects, with a nontoxic pharmaceutical carrier according to accepted procedures. Preferably the dosage units will contain a phosphine gold complex of Formula I or an alkali metal salt thereof where $R^2$ is carboxy in an amount of from about 0.5 mg. to about 5 mg., calculated on gold content, per unit.

The pharmaceutical carrier employed may be, for example, either a solid or liquid. Exemplary of solid carriers are lactose, terra alba, sucrose, talc, gelatin, agar, pextin, pectin, magnesium stearate, stearic acid and the like. Exemplary of liquid carriers are syrup, peanut oil, olive oil, water and the like. Similarly, the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method of producing anti-arthritic activity in accordance with this invention comprises administering internally to an animal organism a phosphine gold complex of Formula I, usually combined with a pharmaceutical carrier, in an amount sufficient to produce anti-arthritic activity without limiting side effects. The active medicament will be administered in a dosage unit, as described above, orally or parenterally the oral route being preferred. Advantageously equal doses will be administered one or two times daily with the daily dosage regimen being from about 0.5 mg. to about 5 mg., calculated on gold content. When the method described above is carried out, anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of this invention and their incorporation into pharmaceutical compositions, and as such are not to be considered as limiting the invention set forth in the claims appended hereto. Temperatures are in degrees Centigrade unless otherwise stated.

EXAMPLE 1

S-Triethylphosphine(thiobenzoyl)gold

A solution of 10.0 g. (0.08 mol.) of thiodiglycol in 25 ml. of ethanol was mixed with a solution of 15.76 g. (0.04 mol.) of gold acid chloride trihydrate in 75 ml. of distilled water. When the bright orange-yellow solution was almost colorless, it was cooled to below −5° and an equally cold solution of 5.0 g. (0.0425 mol.) of triethylphosphine in 25 ml. of ethanol was added dropwise to the stirred solution. After addition, the cooled mixture was stirred for 30 minutes. The solid that separates was removed by filtration and the filtrate was concentrated to about 30 ml. to yield a second crystal crop. The combined solid was washed with aqueous ethanol (2:1) and recrystallized from ethanol by addition of water to the cloud point to give triethylphosphinegold(I) chloride as white needles, m.p. 85°–86°.

To a solution of 0.69 g. (0.005 mol.) of thiobenzoic acid in 10 ml. of ethanol was added 0.28 g. (0.005 mol.) of potassium hydroxide in 10 ml. of ethanol followed by 1.75 g. (0.005 mol.) of triethylphosphinegold(I) chloride in 25 ml. of ethanol. The reaction mixture was stirred for one hour at 25° under nitrogen, then it was filtered and the filtrate was evaporated to dryness. The residue was taken up in about 20 ml. of chloroform and chromatographed on 50 g. of silica gel with benzene and benzene-methanol (1:1) to give the title compound, m.p. 68°–70° (methanol).

EXAMPLE 2

S-Triethylphosphine(2-carboxyphenylthio)gold

To a solution of 0.400 g. (0.01 mol.) of sodium hydroxide in 20 ml. of aqueous ethanol (1:1) was added 0.77 g. (0.005 mol.) of o-mercaptobenzoic acid in 20 ml. of ethanol, followed by 1.75 g. (0.005 mol.) of triethylphosphinegold(I) chloride in 20 ml. of ethanol-chloroform (1:1). The solution was stirred at 25° under nitrogen for one hour, then it was filtered and the filtrate was acidified with 6 ml. of 1N acetic acid to about pH 5.5. The acidic solution was evaporated to dryness and the residue was dissolved in chloroform. The chloroform solution was dried (MgSO$_4$) and concentrated to give the title compound, m.p. 109.5°–110°.

EXAMPLE 3

S-Triethylphosphine(2-aminophenylthio)gold

To a cold solution of 2.52 g. (0.02 mol.) of 2-aminothiophenol in 20 ml. of ethanol was added 0.80 g. (0.02 mol.) of sodium hydroxide in 10 ml. of water followed by 7.0 g. (0.02 mol.) of triethylphosphinegold(I) chloride in 40 ml. of ethanol. A white precipitate formed immediately. The reaction mixture was stirred at 25° under nitrogen for one hour, then the precipitate was collected by filtration to give the title compound, m.p. 87°–88.5° (methanol).

EXAMPLE 4

S-Triisopropylphosphine(thiobenzoyl)gold

A solution of 11.82 g. (0.03 mol.) of gold acid chloride trihydrate and 7.9 g. (0.065 mol.) of thiodiglycol in 100 ml. of aqueous ethanol (3:2) was stirred until the color of auric gold disappeared. The almost colorless solution was cooled below −5° and an equally cold solution of 5.6 g. (0.035 mol.) of triisopropylphosphine in 20 ml. of ethanol was added dropwise. The volume of the final reaction mixture was increased to 250 ml. with 1:1 aqueous ethanol in order to maintain a fluid mixture. After addition, the mixture was stirred in the cold for 45 minutes. The solid was removed by filtration, washed with 1:2 alcohol-water, then dried. It was redissolved by suspension in ethanol and addition of sufficient methylene chloride for solution. The cloudy solution was filtered from suspended gold and the filtrate was concentrated until crystallization to give triisopropylphosphinegold(I) chloride as white crystals, m.p. 184°–186°.

When an equivalent amount of triisopropylphosphinegold(I) chloride is substituted in the procedure of Example 1 for triethylphosphinegold(I) chloride, the title compound is obtained.

EXAMPLE 5

When an equivalent amount of triisopropylphosphinegold(I) chloride is substituted in the procedure of Example 2 for triethylphosphinegold(I) chloride, S-triisopropylphosphine(2-carboxyphenylthio)gold is obtained.

In like manner, substitution of an equivalent amount of triisopropylphosphinegold(I) chloride in the procedure of Example 3 for triethylphosphinegold(I) chloride gives S-triisopropylphosphine(2-aminophenylthio)gold.

EXAMPLE 6

S-Trimethylphosphine(thiobenzoyl)gold

A solution of 2.44 g. (0.02 mol.) of thiodiglycol in 15 ml. of methanol was mixed with a solution of 3.98 g. (0.01 mol.) of gold acid chloride trihydrate in 25 ml. of distilled water. When the orange-yellow solution became almost colorless, it was cooled to −15° and an equally cold solution of 760 mg. (0.01 mol.) of trimethylphosphine in 10 ml. of methanol was added dropwise to the stirred solution. After the addition, the cooled mixture was stirred for 30 minutes. The product was filtered off and the filtrate was concentrated in vacuo to give a second crystal crop. The combined product was washed with cold aqueous methanol (2:1) and water to give trimethylphosphinegold(I) chloride, m.p. 228°–229°.

When an equivalent amount of trimethylphosphinegold(I) chloride is substituted in the procedure of Example 1 for triethylphosphinegold(I) chloride, the title compound is obtained.

EXAMPLE 7

Substitution of an equivalent amount of trimethylphosphinegold(I) chloride in the procedure of Example 2 for triethylphosphinegold(I) chloride gives S-trimethylphosphine-(2-carboxyphenylethio)gold.

Likewise, when an equivalent amount of trimethylphosphinegold(I) chloride is substituted in the procedure of Example 3 for triethylphosphinegold(I) chloride, S-trimethylphosphine(2-aminophenylthio)gold is obtained.

EXAMPLE 8

S-Triphenylphosphine(thiobenzoyl)gold

Gold acid chloride trihydrate (4.0 g; 0.01 mol.) was reduced to aurous chloride with thiodiglycol in 1:2 aqueous ethanol. After cooling this solution in an ice bath, a cold solution of 2.62 g. (0.01 mol.) of triphenylphosphine in a minimum amount of ethanol was added with stirring. The reaction mixture was stirred for about 30 minutes, then it was filtered and the product was washed with cold aqueous alcohol and water and dried to give triphenylphosphinegold(I) chloride, m.p. 242°–243°.

Substitution of an equivalent amount of triphenylphosphinegold(I) chloride in the procedure of Example 1 for triethylphosphinegold(I) chloride gives the title compound.

EXAMPLE 9

When an equivalent amount of triphenylphosphinegold(I) chloride is substituted in the procedure of Example 2 for triethylphosphinegold(I) chloride, S-triphenylphosphine(2-carboxyphenylthio)gold is obtained.

Similarly, when an equivalent amount of triphenylphosphinegold(I) chloride is substituted in the procedure of Example 3 for triethylphosphinegold(I) chloride, S-triphenylphosphine(2-aminophenylthio)gold is obtained.

EXAMPLE 10

S-Triethylphosphine(2-aminothiobenzoyl)gold

When an equivalent amount of thioanthranilic acid (U.S. Pat. No. 3,123,631) is substituted in the procedure of Example 1 for thiobenzoic acid, the title compound is obtained

EXAMPLE 11

When thioanthranilic acid and triisopropylphosphinegold(I) chloride are allowed to react according to the procedure of Example 1, S-triisopropylphosphine(2-aminothiobenzoyl)gold is obtained.

In like manner, S-trimethylphosphine(2-aminothiobenzoyl)gold is obtained from thioanthranilic acid and trimethylphosphinegold(I) chloride.

Similarly, thioanthranilic acid and triphenylphosphinegold(I) chloride gives S-triphenylphosphine(2-aminothiobenzoyl)gold

EXAMPLE 12

S-Triethylphosphine(2-carboxythiobenzoyl)gold

Substitution of an equivalent amount of monothiophthalic acid [*J. Indian Chem. Soc.*, 5:397 (1928)] in the procedure of Example 2 for o-mercaptobenzoic acid gives the title compound.

EXAMPLE 13

When monothiophthalic acid and triisopropylphosphinegold(I) chloride are substituted in the procedure of Example 2 for o-mercaptobenzoic acid and triethylphosphinegold(I) chloride, S-triisopropylphosphine(2-carboxythiobenzoyl)gold is obtained.

In a similar manner, S-trimethylphosphine(2-carboxythiobenzoyl)gold is prepared from monothiophthalic acid and trimethylphosphinegold(I) chloride.

Likewise, when monothiophthalic acid and triphenylphosphinegold(I) chloride are used as starting materials, S-triphenylphosphine(2-carboxythiobenzoyl gold is obtained.

EXAMPLE 14

By following procedures outlined in *J. Chem. Soc.*, 1828 (1937) trialkylphosphinegold(I) iodide complexes are prepared, for example, triethylphosphinegold(I) iodide.

When an equivalent amount of triethylphosphinegold(I) iodide is substituted in the procedure of Example 1 for triethylphosphinegold(I) chloride, S-triethylphosphine(thiobenzoyl)gold is obtained.

Similarly, by following procedures outlined in *J. Chem. Soc.*, 1235 (1940), trialkylphosphinegold(I) bromide complexes are prepared, for example, triethylphosphinegold(I) bromide.

Substitution of an equivalent amount of triethylphosphinegold(I) bromide in the procedure of Example 1 for triethylphosphinegold(I) chloride also gives S-triethylphosphine(thiobenzoyl)gold.

By similar procedures, the other phosphine gold complexes of Formula I may be prepared as described from the appropriate phosphine gold(I) iodides and bromides.

EXAMPLE 15

S-Triethylphosphite(thiobenzoyl)gold

Gold acid chloride trihydrate (5.9 g., 0.015 mol.) is reduced to aurous chloride with 3.7 g. (0.03 mol.) of thiodigylcol in 1:2 aqueous ethanol. The solution is cooled to −10° and an equally cold solution of 3.72 g. (0.02 mol.) of triethylphosphite in 20 ml. of ethanol is added dropwise with stirring. The temperature is maintained at −10° and stirring is continued for 30 minutes. The ethanol is removed from the reaction mixture under reduced pressure without heating. The aqueous residue is extracted with methylene chloride and the dried extract is evaporated in vacuo. The crude product is purified by chromatography on a silica column to give triethylphosphitegold(I) chloride as an oil.

When an equivalent amount of triethylphosphitegold(I) chloride is substituted in the procedure of Example 1 for triethylphosphinegold(I) chloride, the title compound is obtained.

EXAMPLE 16

S-Triethylphosphite(2-carboxyphenylthio)gold is prepared by substitution of an equivalent amount of triethylphosphitegold(I) chloride in the procedure of Example 2 for triethylphosphinegold(I) chloride.

Similarly, S-triethylphosphite(2-aminophenylthio)-gold is obtained from substitution of an equivalent amount of triethylphosphitegold(I) chloride in the procedure of Example 3 for triethylphosphinegold(I) chloride.

When an equivalent amount of triethylphosphitegold(I) chloride is substituted in the procedure of Example 10 for triethylphosphinegold(I) chloride, S-triethylphosphite(2-aminothiobenzoyl)gold is obtained.

In like manner, substitution of an equivalent amount of triethylphosphitegold(I) chloride in the procedure of Example 12 for triethylphosphinegold(I) chloride gives S-triethylphosphite(2-carboxythiobenzoyl)gold

EXAMPLE 17

S-Trimethylphosphite(thiobenzoyl)gold

Gold acid chloride trihydrate (4.0 g.) was reduced to aurous chloride with 2.44 g. of thiodiglycol in 1:2 aqueous methanol. The resulting solution was cooled to below −5° and an equally cold solution of 1.5 g. of trimethylphosphite in 10 ml. of methanol was added dropwise with stirring under nitrogen. The reaction mixture was stirred for 30 minutes, filtered and the solid was washed with cold aqueous methanol and dried. The product was dissolved in 5 ml. of chloroform, diluted with 10 ml. of methanol and filtered through charcoal. The filtrate was concentrated in vacuo, cooled and diluted with ice-water to precipitate trimethylphosphitegold(I) chloride, m.p. 99°–100°.

Substitution of an equivalent amount of trimethylphosphitegold(I) chloride in the procedure of Example 1 for triethylphosphinegold(I) chloride gives the title compound.

EXAMPLE 18

When an equivalent amount of trimethylphosphitegold(I) chloride is substituted in the procedures of Examples 2, 3, 10 and 12 for triethylphosphinegold(I) chloride, the following phosphite gold complexes are obtained, respectively:

S-trimethylphosphite(2-carboxyphenylthio)gold
S-trimethylphosphite(2-aminophenylthio)gold
S-trimethylphosphite(2-aminothiobenzoyl)gold
S-trimethylphosphite(2-carboxythiobenzoyl)gold.

EXAMPLE 19

S-Triphenylphosphite(thiobenzoyl)gold

When an equivalent amount of triphenylphosphite is substituted in the procedure of Example 15 for triethylphosphite, triphenylphosphitegold(I) chloride is obtained.

Substitution of an equivalent amount of triphenylphosphitegold(I) chloride in the procedure of Example 1 for triethylphosphinegold(I) chloride gives the title compound.

EXAMPLE 20

When an equivalent amount of triphenylphosphitegold (I) chloride is substituted in the procedures of Example 2, 3, 10 and 12 for triethylphosphinegold(I) chloride, the following phosphite gold complexes are obtained, respectively:

S-triphenylphosphite(2-carboxyphenylthio)gold
S-triphenylphosphite(2-aminophenylthio)gold
S-triphenylphosphite(2-aminothiobenzoyl)gold
S-triphenylphosphite(2-carboxythiobenzoyl)gold.

EXAMPLE 21

| Ingredients | Mg./Tablet |
| --- | --- |
| S-Triethylphosphine(2-carboxy-phenylthio)gold | 5 |
| Calcium sulfate, dihydrate | 150 |
| Sucrose | 25 |
| Starch | 15 |
| Talc | 5 |
| Stearic acid | 3 |

The sucrose, calcium sulfate and S-triethylphosphine(2-carboxyphenylthio)gold are thoroughly mixed and granulated with hot 10% gelatin solution. The wetted mass is passed through a No. 6. mesh screen directly onto drying trays. The granules are dried at 120°F. and passed through a No. 20 mesh screen, mixed with the starch, talc and stearic acid and compressed into tablets.

In a similar manner, the other phosphine or phosphite gold complexes disclosed herein may be formulated into tablets.

What is claimed is:

1. A pharmaceutical composition having anti-arthritic activity, in dosage unit form, comprising a pharmaceutical carrier and an effective but nontoxic amount of a compound of the formula:

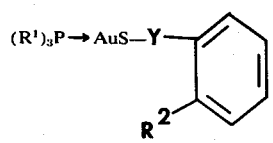

in which:

R¹ is lower alkyl, lower alkoxy, phenyl or phenoxy with each alkyl or alkoxy having from one to three carbon atoms;

Y is a carbon-sulfur single bond or C=O;

R² is hydrogen, amino or COOM when Y is C=O, or amino or COOM when Y is a carbon-sulfur single bond; and M is hydrogen or an anti-arthritically alkali metal cation.

2. The composition of claim 1 in which R¹ is lower alkyl of from one to three carbon atoms.

3. The composition of claim 2 in which R² is hydrogen and Y is C=O.

4. The composition of claim 3 in which R¹ is ethyl.

5. The composition of claim 2 in which R² is carboxy and Y is a carbon-sulfur single bond.

6. The composition of claim 5 in which R¹ is ethyl.

7. The composition of claim 2 in which R² is amino and Y is a carbon-sulfur single bond.

8. The composition of claim 7 in which R¹ is ethyl.

9. The composition of claim 1 in which the active medicament is in an amount of about 0.5 mg. to about 5 mg. per dosage unit, calculated on gold content.

10. The method of producing anti-arthritic activity which comprises administering internally to an animal organism in need of said activity in an amount sufficient to produce said activity a compound as defined in claim 1.

11. The method of claim 10 in which $R^1$ is lower alkyl of from one to three carbon atoms.

12. The method of claim 11 in which $R^2$ is hydrogen and Y is C=O.

13. The method of claim 11 in which $R^2$ is carboxy and Y is a carbon-sulfur single bond.

14. The method of claim 11 in which $R^2$ is amino and Y is a carbon-sulfur single bond.

15. The method of claim 10 in which the active medicament is administered in a daily dosage regimen of about 0.5 mg. to about 5 mg., calculated on gold content.

* * * * *

UNITED STATES PATENT AND TRADEMARK OFFICE
CERTIFICATE OF CORRECTION

PATENT NO. : 3,903,274
DATED : September 2, 1975
INVENTOR(S) : Blaine M. Sutton and Joseph Weinstock It is certified that error appears in the above-identified patent and that said Letters Patent are hereby corrected as shown below:

Column 1, Formula I should appear as:

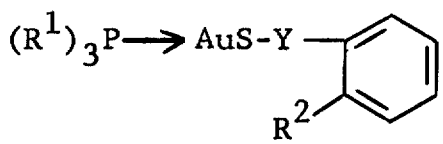

Column 2, line 35   "where" should read --when--

Column 2, line 41   delete "pextin"

insert -- acacia, -- after "pectin,"

Column 5, line 10   "-(2-carboxyphenylethio)gold" should read

-- -(2-carboxyphenylthio)gold --

Column 8, Claim 1, line 30   after "an" insert
-- anti-arthritically -- line 49   delete "anti-arthritically"

Signed and Sealed this

Third Day of August 1976

[SEAL]

Attest:

RUTH C. MASON
*Attesting Officer*

C. MARSHALL DANN
*Commissioner of Patents and Trademarks*